(12) United States Patent
Kravitz et al.

(10) Patent No.: US 11,439,143 B2
(45) Date of Patent: Sep. 13, 2022

(54) TEMPERATURE SENSING IN ORGAN PRESERVATION APPARATUS

(75) Inventors: David Kravitz, Barrington Hills, IL (US); Christopher P. Steinman, Sandy, UT (US); David Pettinato, Schaumburg, IL (US); Richard K. Buck, Crystal Lake, IL (US); John Stark, Bartlett, IL (US); Robert J. Allen, Crystal Lake, IL (US)

(73) Assignee: LIFELINE SCIENTIFIC, INC., Itasca, IL (US)

( * ) Notice: Subject to any disclaimer, the term of this patent is extended or adjusted under 35 U.S.C. 154(b) by 0 days.

(21) Appl. No.: 13/545,473

(22) Filed: Jul. 10, 2012

(65) Prior Publication Data

US 2014/0017664 A1    Jan. 16, 2014

(51) Int. Cl.
*A01N 1/02* (2006.01)

(52) U.S. Cl.
CPC ......... *A01N 1/0247* (2013.01); *A01N 1/0273* (2013.01)

(58) Field of Classification Search
CPC ...... A01N 1/0247; A01N 1/0273; A01N 1/00; A01N 1/021
USPC .......................................................... 435/1.2
See application file for complete search history.

(56) References Cited

U.S. PATENT DOCUMENTS

| | | | |
|---|---|---|---|
| 4,837,390 A | 6/1989 | Reneau | |
| 5,586,438 A | 12/1996 | Fahy | |
| 6,248,066 B1 * | 6/2001 | Barnett et al. | 600/363 |
| 6,490,880 B1 * | 12/2002 | Walsh | A01N 1/02 62/371 |
| 6,673,594 B1 * | 1/2004 | Owen | A01N 1/02 435/284.1 |
| 6,953,655 B1 | 10/2005 | Hassanein et al. | |
| 7,651,835 B2 | 1/2010 | Hassanein et al. | |
| 7,749,693 B2 | 7/2010 | Brassil et al. | |
| 7,985,536 B2 | 7/2011 | Brasile | |
| 8,097,449 B2 | 1/2012 | Garland et al. | |
| 2001/0031459 A1 | 10/2001 | Fahy et al. | |
| 2003/0149401 A1 | 8/2003 | Benetti Diaz De Brito et al. | |
| 2004/0221719 A1 | 11/2004 | Wright et al. | |
| 2008/0286746 A1 | 11/2008 | Poo et al. | |
| 2010/0028850 A1 | 2/2010 | Brassil | |
| 2010/0092939 A1 | 4/2010 | Belous et al. | |
| 2011/0173023 A1 * | 7/2011 | LeClair | G06Q 10/08 705/2 |
| 2011/0294108 A1 | 12/2011 | Argoudelis et al. | |
| 2011/0300615 A1 | 12/2011 | Owen et al. | |
| 2012/0178076 A1 * | 7/2012 | Fujita et al. | 435/1.2 |
| 2014/0017664 A1 | 1/2014 | Kravitz et al. | |

FOREIGN PATENT DOCUMENTS

| | | |
|---|---|---|
| EP | 2301337 A2 | 3/2011 |
| EP | 2 871 948 B1 | 8/2018 |
| JP | 4567806 B1 | 10/2010 |
| WO | WO 02/26034 A2 | 4/2002 |
| WO | 2014/011558 A1 | 1/2014 |

OTHER PUBLICATIONS

Gorbach et al., 2009, Transplantation, 87, 1163-1166.*
Jul. 8, 2013 European Search Report issued in European Application No. PCT/US2013/049586.
Jul. 8, 2013 Written Opinion of the International Searching Authority.
Apr. 1, 2009, Alexaner M. Gorbach et al: "Assessment of Cadaveric Organ Viability During Pulsatile Perfusion Using Infrared Imaging".
Jul. 21, 2007 "LifePort Kidney Transporter—Operator's Manual (Organ Recovery Systems)".
Jan. 13, 2015 International Preliminary Report on Patentability issued in International Patent Application No. PCT/US2013/049586.
Oct. 17, 2016 Office Action issued in Chinese Patent Application No. 201380046835.4.
Apr. 7, 2017 Office Action issued in European Application No. 13741925.5.
Nov. 30, 2015 Office Action issued in Chinese Patent Application No. 201380046835.4.
Jan. 31, 2017 Office Action issued in Japanese Application No. 2015-521694.
Aug. 3, 2017 Office Action issued in Chinese Patent Application No. 201380046835.4.
Dec. 3, 2019 Office Action issued in Brazilian Patent Application No. 112015000495-4.
Jun. 15, 2018 Office Action issued in Chinese Patent Application No. 201380046835.4.
May 7, 2019 Office Action issued in Canadian Application No. 2,917,831.
Nov. 28, 2017 Office Action issued in Japanese Patent Application No. 2015-521694.
Nov. 23, 2020 Office Action issued in Chinese Patent Application No. 201910113197.2.

(Continued)

*Primary Examiner* — Nghi V Nguyen
(74) *Attorney, Agent, or Firm* — Oliff PLC (57) ABSTRACT

A temperature sensor for monitoring an organ or tissue is configured to measure a temperature inside of a container configured to contain the organ or tissue. The temperature sensor is disposed exterior to the organ container and the temperature sensor is a non-contact temperature sensor. The temperature sensor may be part of an apparatus for perfusing, transporting, and/or storing an organ or tissue. A coolant container may have an aperture through which the temperature sensor measures a temperature of at least one of the organ or tissue or a perfusate fluid surrounding the organ or tissue. The temperature sensor is preferably an infrared temperature sensor. Multiple temperature sensors may be provided that measure the temperature organ or tissue or perfusate fluid surrounding the organ or tissue, for example in case one of the temperature sensors fails.

25 Claims, 4 Drawing Sheets

(56) References Cited

OTHER PUBLICATIONS

Jul. 13, 2021 Office Action issued in Chinese Patent Application No. 201910113197.2.
Jan. 7, 2022 Office Action issued in Chinese Patent Application No. 201910113197.2.

* cited by examiner

TEMPERATURE SENSING IN ORGAN PRESERVATION APPARATUS

BACKGROUND

Related technical fields include organ and tissue perfusion apparatuses that are capable of sustaining and/or restoring viability of organs and tissues and preserving organs and tissues for storage and/or transport, and more particularly that include temperature sensors for measuring temperatures with the perfusion apparatuses.

Ex-vivo use of an organ or tissue, such as for preparing for transplantation, research, diagnosis, and/or treatment, often requires systems and devices for preserving organs or tissue in near ideal conditions and physiological states. It is often the objective of organ or tissue perfusion to mimic the conditions of the human body such that the organ or tissue remains viable. Many times the organ or tissue needs to be stored and/or transported between facilities. A goal of sustaining and restoring organs or tissues is to reduce ischemia and reperfusion injury. The increase in storage periods in a normal or near normal functioning state also provides certain advantages, for example, organs or tissue can be transported greater distances and there is an increased time for testing and evaluation of the organs or tissues.

It is known to perfuse an organ or tissue with a perfusate fluid in order to maintain and sustain the organ or tissue after it has been harvested from a donor. The perfusate fluid usually contains additives and/or nutrients to help maintain the organ or tissue. The perfusate fluid enters into the organ or tissue, for example through a blood vessel, and either exits the organ or tissue through, for example, another blood vessel or may exit the organ or tissue through other pathways. Perfusate fluid may form a pool or bath of perfusate around the organ or tissue. For ease of reference herein, the term "organ" will mean "organ and/or tissue" unless otherwise indicated.

To ensure that organs are in near ideal conditions or physiological states, different types of sensors and/or monitors are used to measure different variables of the organ. One variable to measure is temperature. Conventionally, temperature sensors are used to measure a temperature by contacting the organ or perfusate in an organ container or perfusate flow path with a temperature sensor, or to estimate a temperature through non-contacting devices downstream in the perfusate flow path. See, for example, U.S. Patent Application Publications No. 2011/0300615 to Owen et al and No. 2004/0221719 to Wright et al.

SUMMARY

A problem with conventional organ or tissue perfusion machines, including those disclosed in the documents cited above, is that the temperature sensor does not accurately monitor temperature and/or may cause damage to the organ or tissue during the monitoring of the temperature of the organ or tissue. Temperature sensors that monitor temperature of perfusate fluid in tubing or piping (not directly at the organ) of the perfusion machine provide only an estimate, at best, of the temperature of the organ itself because the perfusate fluid may fluctuate in temperature as it passes through differently heated and/or cooled portions of the perfusion machine before returning back to the organ. Additionally, in the event that the perfusate stops flowing and remains stationary due to, for example, a jolt or shake during transportation of the perfusion machine causing it to temporarily stop pumping or failure of a perfusate pump, the temperature sensor may indicate that the estimated temperature of the organ is an unacceptable and unrealistic temperature when the temperature of the organ is in fact remaining at an acceptable level because the temperature of the perfusate remaining idle in the tubing is not the temperature of the organ In this situation, the perfusate bath temperature has remained stable in the basin surrounding part of, or the entire organ.

Other types of temperature sensors are placed in direct contact with the organ to measure the temperature of the organ directly. However, these types of temperature sensors potentially cause damage to the organ because the methods of securing the temperature sensor to the organ may puncture the organ or otherwise cause trauma to the organ. Additionally, the organ may be damaged when removing a temperature sensor fixed or attached to the organ because tissue contacting the temperature sensor may be lacerated or break free when the temperature sensor is removed. This could result in loss of the organ.

Thus, a need exists for monitoring the temperature of an organ in a storage and/or transport apparatus such as an organ perfusion machine through minimally or non-invasive means. Additionally, there is a need for accurately measuring the temperature of an organ so that the organ may be monitored and undesired effects such as ischemia can be prevented or minimized during perfusion, transportation, and/or storage of the organ. Further, it is preferred that a temperature sensor measure the temperature directly of, or directly proximate to, an organ to ensure accuracy of the reading instead of an estimated temperature that may not be an accurate representation of the organ temperature.

Advantages of embodiments of the present invention include an organ container and a temperature sensor that allow for accurate and non-invasive monitoring of temperature of an organ. The organ container may contain an organ or may contain tissue. Additionally, there may be multiple temperature sensors that allow for further accuracy of temperature readings of the organ and/or one or more backup sensors in the event of sensor failure.

According to exemplary implementations, a temperature sensor for monitoring an organ is provided. The temperature sensor may be configured to measure a temperature inside of an organ container. The temperature sensor may be disposed exterior to the organ container. The temperature sensor may be a non-contact temperature sensor.

A coolant container external to the organ container may have an aperture through which the temperature sensor measures a temperature inside the organ container. The temperature sensor may be configured to directly measure a temperature of the organ. The temperature sensor may also or alternatively be configured to measure a temperature of a perfusate bath that at least partially, or completely, immerses the organ.

The temperature sensor is preferably an infrared temperature sensor.

Exemplary implementations provide an apparatus for perfusing, transporting, and/or storing an organ. The apparatus preferably has an organ container configured to contain the organ and a non-contact temperature sensor configured to measure a temperature inside of the organ container. The non-contact temperature sensor is preferably disposed exterior to the organ container.

The apparatus may also have one or more second non-contact temperature sensor configured to measure the temperature inside of the organ container. The second non-contact temperature sensor is preferably disposed exterior to the organ container.

Exemplary implementations include a method for monitoring the temperature of an organ. The method may include measuring the temperature of a space inside a coolant container in which an organ or tissue can be held with a first infrared temperature sensor that is located exterior to the space inside the coolant container in which the organ or tissue can be held.

The method may include measuring the temperature of a space inside the coolant container in which the organ or tissue can be held with a second infrared temperature sensor that is located exterior to the space inside the coolant container in which the organ or tissue can be held. The method may include measuring the temperature inside the organ container with the second infrared temperature sensor when the first temperature sensor fails. The method may measure a temperature of a perfusate bath surrounding the organ or tissue. The method may directly measure a temperature of the organ or tissue. The method may measure a temperature inside of an organ or tissue container during perfusion of the organ or tissue in the organ or tissue container.

Other advantages, benefits and features of the present invention will become apparent to those skilled in the art upon reading the detailed description of embodiments herein.

DETAILED DESCRIPTION OF EMBODIMENTS

Referring to the accompanying drawings, apparatus and methods according to various embodiments of the invention will be described.

The following exemplary embodiments refer to a perfusion apparatus, which may be a transport apparatus, diagnostic apparatus, treatment apparatus, and/or storage apparatus for an organ or tissue. Although the exemplary systems and methods according to this disclosure may be applicable to specific applications, the depictions and/or descriptions included in this disclosure are not intended to be limited to any specific application. Any apparatus that may advantageously include an organ or other biological samples as described in an exemplary manner in this disclosure is contemplated.

An apparatus for perfusing, transporting, and/or storing an organ may be configured to contain an organ container that is in turn configured to contain the organ, and includes a non-contact temperature sensor configured to measure a temperature inside of the organ container. The non-contact temperature sensor may be located in a position exterior to the organ container.

Figure 1:
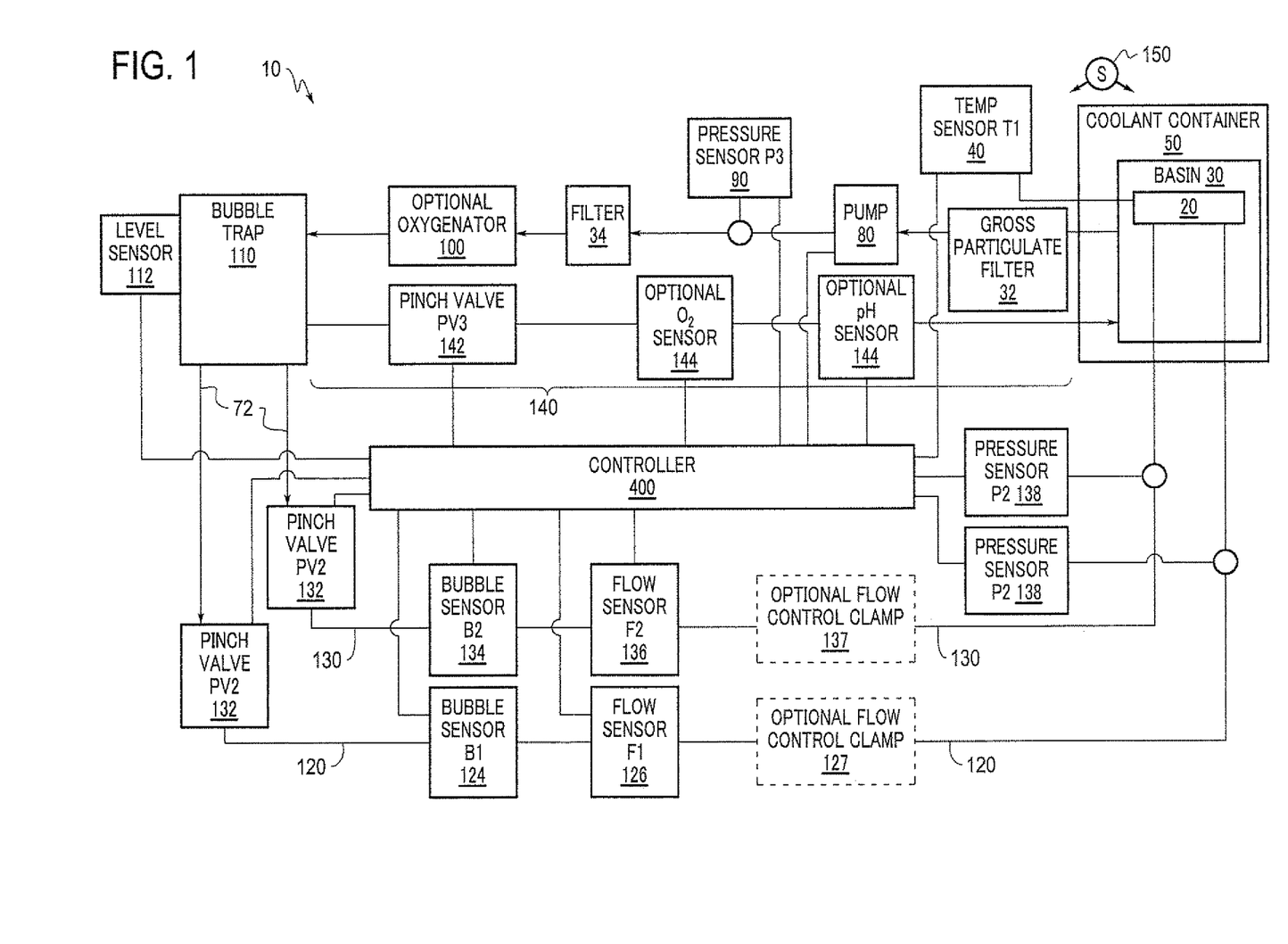
FIG. 1 is a schematic diagram of an organ perfusion apparatus.

FIG. 1 is a schematic diagram of a perfusion apparatus 10 for an organ 20. The organ 20 may preferably be a liver but may be any human or animal, natural or engineered, healthy, injured or diseased organ. The apparatus of FIG. 1 holds a basin 30 in which the organ may be placed. The organ 20 may be disposed in a perfusate fluid bath inside the basin 30. In such a configuration, the basin 30 may include an organ supporting surface configured to hold the organ 20 when the organ is in the perfusate bath. The organ supporting surface may be one of the walls of the basin 30, or it may be an interior surface inside of the basin 30, such as a separable cradle. The basin 30 may include a first filter 32 that can function as a gross particulate filter. The basin 30 is preferably configured to allow a perfusate bath to form around the organ 20. A temperature sensor 40 may be located near the organ 20 to measure a temperature inside or around the basin 30.

The basin 30 is preferably disposed within an insulating coolant container 50 that may contain cold materials such as ice, ice water, brine or the like. Coolant container 50 may be permanently or removably attached to, or an integral, monolithic part of, apparatus 10. Thus, in use, the organ 20 is preferably disposed within a cradle, which is disposed within the basin 30, which is disposed within the coolant container 50.

Preferably, each of the basin 30, cradle, and coolant container 50 is configured, or keyed, to fit within the corresponding mating component(s) in a single orientation relative to one another. The configuration of the coolant container 50, basin 30 and cradle may provide a configuration that provides coolant for the organ 20 without the contents of coolant container 50 contacting the organ 20 or the cradle, thus maintaining a sterile environment within the basin. The basin 30 may be configured to have an exterior surface in contact with a coolant medium of the coolant container 50 or preferably in contact with a wall, such as the inner wall 42, of the coolant container 50. Although the coolant container 50 is described herein as containing ice water, any suitable coolant medium can be used. Ice water may be preferable due to the ease with which ice can be procured, but one of ordinary skill would understand that any suitable coolant medium, which could be an active coolant medium (such as a thermo electric cooler or a refrigerant loop) or a passive coolant medium similar to ice or ice water, or a combination thereof, may be utilized. The amount of ice, or other coolant medium, that can be placed within the coolant container 50 should be determined based upon the maximum time that coolant is to be provided while the organ 20 will be in the apparatus 10.

The cradle may include components configured to securely restrain the organ 20 in place. Such components may, for example, include user selectable netting that is fastened to the cradle. The cradle may also have an organ supporting surface configured to support the organ 20. The organ supporting surface may be a surface that is shaped to receive the organ 20.

In the embodiments of FIG. 1, after passing through the filter 32, the perfusate fluid flows along a first flow path 70 that includes a suitable fluid conduit 72, such as flexible or rigid tubing, a pump 80, a pressure sensor 90, a second filter 34, an optional oxygenator 100 and a bubble trap 110, each of which is discussed below. The perfusate may be recirculated through the first flow path 70.

The first filter 32 is preferably a relatively coarse filter (relative to the second filter 34). Such a coarse filter may be provided to prevent large particles, which may for example be byproducts of the organ or of the organ being removed from the donor, from entering and clogging fluid paths of the apparatus 10. The first filter 32 may be an integral part of the basin 30 or the first filter may be disposed elsewhere in the first flow path 70 downstream of the basin 30. The first filter 32 may also be a separate component from the basin 30 or disposed within the fluid conduit 72.

The first flow path 70 may also include a pump 80. The pump 80 may be any pump that is suitable in connection with perfusing of organs. Examples of suitable pumps may include hand operated pumps, centrifugal pumps and roller pumps. If a roller pump is included, the roller pump may include a single channel or flow path (where only one tube is compressed by the rollers) or the roller pump may include multiple, parallel channels or flow paths (where multiple tubes are compressed by the rollers). If multiple, parallel channels or flow paths are included, the rollers may preferably be disposed out of phase or offset so that pulses created by the rollers are out of phase, which may result in a fluid flow out of the roller pump that is relatively less pulsatile than would be the case with a single roller. Such a multiple channel roller pump may achieve a constant flow rate or a minimally pulsatile flow rate, which may be advantageous depending on the other components in the flow path and/or the type of organ being perfused. The pump 80 is shown as being disposed between the first filter 32 and the second filter 34, but may be disposed upstream of both the first filter 32 and the second filter 34 or may also be disposed downstream of both the first filter 32 and the second filter 34.

The flow path 70 may include a pressure sensor 90. The pressure sensor 90 may preferably disposed after the outlet of the pump 80 in order to monitor and/or be used to control the pressure produced at the outlet of the pump by way of a suitable controller 400. The pressure sensor 90 may provide continuous or periodic monitoring of pressure.

The flow path 70 may include an oxygenator 100 such as an oxygenator membrane or body to provide oxygenation to the perfusate fluid. Oxygen may be provided to the oxygenator 100 by any suitable means. Suitable oxygen sources may include pure oxygen or mixed gases such as air. The gas may be compressed, such as in a high-pressure cylinder, liquefied as would be stored in a dewar, or drawn from the surrounding atmosphere. Preferably, the oxygen may be provided by way of an oxygen generator, which may be separate from the apparatus 10 or integral to the apparatus 10. Oxygen may be generated through any suitable means, some examples of which include through pressure swing adsorption using a molecular sieve, through a ceramic oxygen generator (a solid state oxygen pump) or through decomposition of water.

The flow path 70 may include a bubble trap 110. The bubble trap 110 preferably separates gas bubbles that may be entrained in the perfusate flow and prevents such bubbles from continuing downstream and entering the organ 20. The bubble trap 110 may also function as an accumulator that reduces or eliminates pulsatility of the perfusate flow. The bubble trap 110 may include a volume of gas, initially or through the accumulation of bubbles, such that pressure fluctuations in the perfusate fluid are dampened or eliminated.

The bubble trap 110 may include a vent that allows purging of gas during start up or a purging process. The vent may be connected to or part of purge flow path 140 (which is discussed in detail below). The vent is preferably open during a start up process so that any air or other gas may be purged from the perfusate path 70. Once the gas is purged from the perfusate path 70, the vent may preferably be closed. The vent may be closed manually or may be closed automatically by way of a suitable controller 400.

The bubble trap 110 may include a level sensor 112. A level sensor 112 may optionally be used during the purging process to determine when the purging is complete and/or may be used to determine when the purging process needs to be repeated, which may happen after bubbles have been trapped in the bubble trap 110. Also, through the use of the level sensor 112 and the vent, the accumulator function of the bubble trap can be tuned to account for differing amplitudes and frequencies of pulsatility in the perfusate flow.

The bubble trap 110 may have any number of outlets, as needed for a given application of the perfusion apparatus. In FIG. 1, three outlets are shown connected to three different flow paths, which may be particularly suited for the perfusion of a liver. When perfusing a liver, the three paths preferably include portal flow path 120 connected to the portal vein of a liver, hepatic flow path 130 connected to the hepatic artery of a liver, and bypass flow path 140 that provides a return path to the basin 30. A port may be provided in the fluid path that allows fluid access to the perfusate solution. The port in the depicted embodiment is located in the bubble trap 110. This sample port may be configured to accept a standard luer type syringe that the clinician may use to withdraw a sample of the perfusate solution for analysis. The port may also be utilized by the clinician to add drugs or other substances to the perfusate solution without opening the basin.

As shown in FIG. 1, the portal flow path 120 and hepatic flow path 130 may optionally include similar or different components such as valves 122, 132; bubble sensors 124, 134; flow sensors 126, 136; flow control clamps 127, 137; and pressure sensors 128, 138. Each similar component may function in a similar manner, and such pairs of components may optionally be structurally and/or functionally identical to reduce manufacturing costs. Flow sensors 126, 136 are preferably ultrasonic sensors, disposed around tubing, although any suitable sensor may be used. Ultrasonic sensors may be advantageous because in normal usage they do not come into contact with the perfusate fluid, are not in the sterile path, and therefore do not require replacement and/or cleaning after use.

Valves 122, 132 may be pinch valves that function to squeeze tubing and reduce or shut off flow, but any suitable valve may be used. Pinch valves may be advantageous because in normal usage they do not come into contact with the perfusate fluid, are not in the sterile path, and therefore do not require replacement and/or cleaning after use.

Preferably, the bubble sensors 124, 134 are ultrasonic sensors disposed around tubing, although any suitable sensor may be used. Similar to pinch valves, ultrasonic sensors may be advantageous because in normal usage they do not come into contact with the perfusate fluid, are not in the sterile path, and therefore do not require replacement and/or cleaning after use. Instead, ultrasonic sensors can be disposed in contact with, adjacent to or around an external surface of tubing in order to sense bubbles.

Flow control clamps 127, 137 may be used to fine-tune the flow rate in one or both of portal flow path 120 and hepatic flow path 130. Preferably, the organ provides self-regulation to control an amount of flow that exits the bubble trap 110 and is divided between the portal flow path 120 and the hepatic flow path 130. In such self regulated flow, pressure sensors 128, 138 provide overpressure monitoring. In the event that pressure delivered to the organ in either or both of the portal flow path 120 or the hepatic flow path 130 exceeds a predetermined threshold, the apparatus 10 can automatically stop and/or reduce the flow rate provided by the pump 80 to prevent damage to the organ. In addition or alternatively, the pressure sensors 128, 138 may be used to generate warning signals to the user and/or to an appropriate controller 400 as pressures approach the predetermined threshold.

After exiting one or both of the portal flow path 120 and hepatic flow path 130, perfusate flows through the organ and returns to the basin 30 to form an organ bath.

Bypass flow path 140 may include a valve 142, and/or sensors such as oxygen sensor 144 and pH sensor 146. Preferably, the valve 142 is a pinch valve and may be of similar configuration to valves 122 and 132, but any suitable valve may be used. The oxygen sensor 144 and the pH sensor 146 may be used to determine the state of the perfusate. Preferably, the bypass flow path 140 is only used during a purging or priming process, although it may also be used during perfusion, preferably continuously, to monitor perfusate properties in real time.

The organ perfusion apparatus 10 may also include an accelerometer 150. Preferably the accelerometer 150 is a three-axis accelerometer, although multiple single axis accelerometers may be used to the same effect. The accelerometer 150 may be used to continuously or periodically monitor and/or record the state of the apparatus 10. Monitoring may include monitoring for excessive shocks as well as attitude of the apparatus 10. By implementing such monitoring, misuse or potentially inappropriate conditions of the apparatus 10 can be detected and recorded.

The apparatus 10 may include storage compartments for items other than the organ 20. For example, the apparatus 10 may include a document compartment 160 to store documents and/or charts related to the organ 20. Also, the apparatus 10 may include one or more sample compartment 170. The sample compartment 170 may be configured, for example, to store fluid and/or tissue samples. The sample compartment 170 may be advantageously disposed near the coolant container 50 to provide coolant, which may be similar or equivalent to the coolant provided for the organ 20.

Preferably, all components of the apparatus 10 that come into contact with perfusate and/or the organ 20 are disposable and/or easily replaced. Such disposable items may be included in a kit as a saleable package. For example, such a kit may include packaging such as plastic or shrink wrap packaging containing some or all of the components that come into contact with an organ 20 and/or perfusate. In embodiments, the tubing, filter, oxygenator and bubble trap are packaged together, and the cradle and basin are packaged individually or together, and optionally together with the tubing, filter, oxygenator and bubble trap in a manner preconfigured to be placed into a flow path arrangement of fixed-location parts in apparatus 10.

Figure 2:
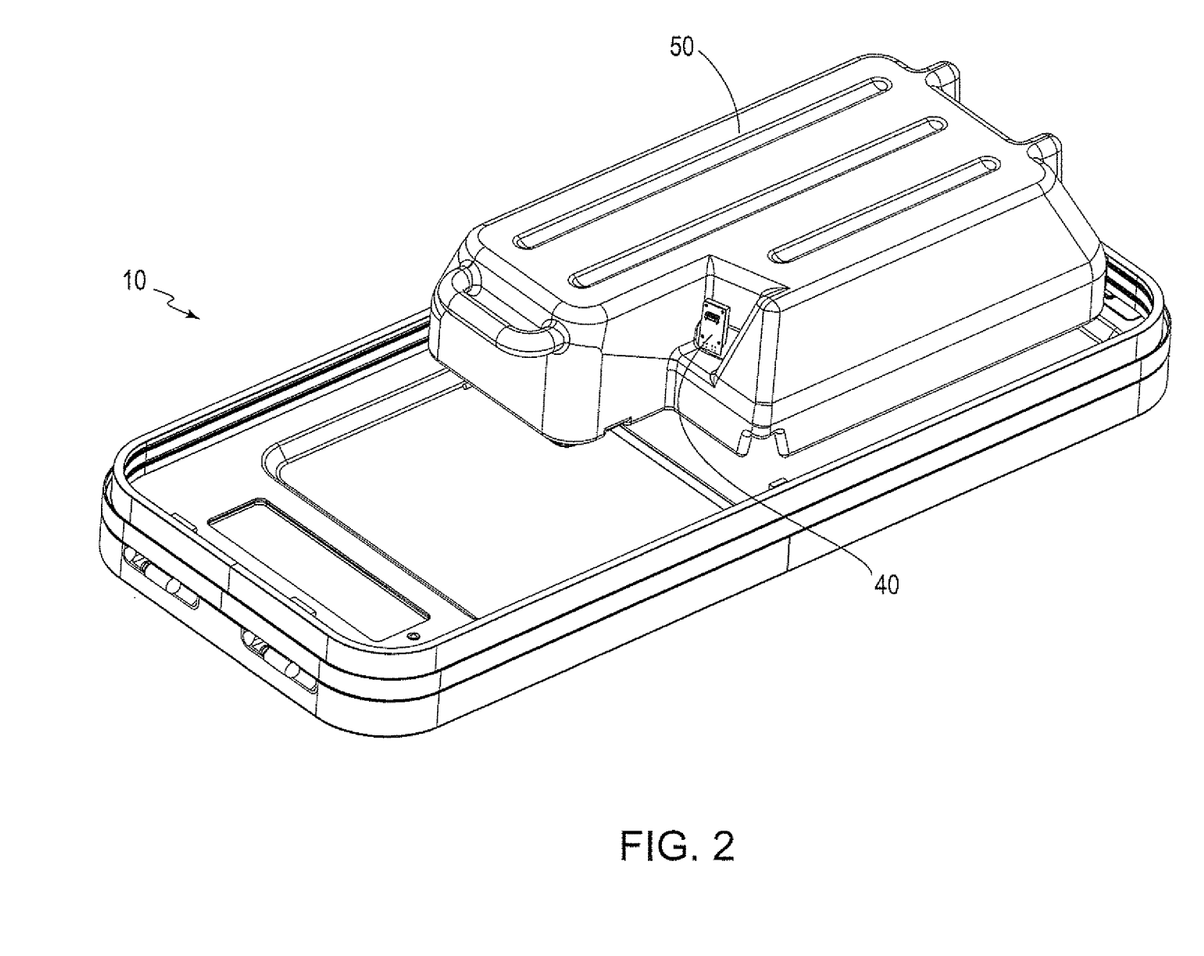
FIG. 2 is a perspective view of an organ perfusion apparatus and temperature sensor.

FIG. 2 is a perspective view of exemplary components of embodiments such as embodiments of the apparatus 10, including temperature sensor 40. Temperature sensor 40 is preferably located outside (exterior to) the coolant container 50 and basin 30. The temperature sensor 40 may be located in or near the coolant container 50. The basin 30 and/or coolant container 50 may be made of an optically clear material that allows for the temperature sensor 40 to measure a temperature inside of the basin 30 and/or coolant container 50. A preferred material for the basin is polycarbonate plastic resin. A preferred material for the coolant container is an olefin such as polyethylene. However, other polymer and non-polymer materials may be used. Preferably the basin 30 is made wholly or in part of a material through which the infrared temperature measurements can be made.

The temperature sensor 40 is preferably located exterior to the basin 30 so that the temperature sensor 40 does not contact the organ 20 or the perfusate fluid surrounding the organ 20. By not allowing the temperature sensor 40 to contact the perfusate fluid, the temperature sensor 40 does not need to be sterilized to prevent contamination of the perfusate fluid. This allows for the temperature sensor 40 to, be used for multiple organ transplantations without having to dispose of or change the temperature sensor 40 when an organ 20 being perfused, transported, or stored is taken out of the apparatus 10 and a different organ is placed in the apparatus 10.

The apparatus 10 may include multiple temperature sensors 40, which may provide redundancy in the event of a failure and/or may provide temperature measurement at multiple locations. The multiple temperature sensors 40 may be activated one sensor at a time, e.g., if a first sensor fails, then a second sensor is activated, or one or more sensors may operate simultaneously. If multiple temperature sensors 40 are used, one temperature sensor 40 can be used to detect failure in another temperature sensor 40. A preferred method simultaneously monitors both sensors using firmware programmed into a CPU, for example in controller 400. The firmware will constantly or periodically compare temperatures from each sensor. If one of the sensors discontinues functioning, or falls outside a tolerance range, the CPU will preferably disregard its output and only monitor the remaining functional sensor(s). In the event of a dysfunctional sensor, a command may also be sent to a user interface display module alerting a clinician of a malfunction.

Preferably, the temperature sensor 40 is an infrared temperature sensor. However, the temperature sensor 40 may be any type of non-contact temperature sensor 40 and may also be a contact temperature sensor 40. When the temperature sensor 40 is an infrared temperature sensor, the temperature sensor 40 is preferably pointed, aimed, or focused toward a portion of the basin 30 that is below the surface of the perfusate fluid and/or within the coolant container 50. More preferably, an infrared temperature sensor is pointed, aimed or focused towards the organ 20.

The temperature sensor(s) 40 is preferably disposed as close as practical to the organ 20 when the organ 20 is disposed in the basin 30 in order to improve the usefulness and accuracy of the temperature sensor(s) 40. The temperature sensor(s) 40 may provide a temperature measurement of the perfusate located inside the basin 30 that may be correlated to a temperature of the organ 20. Alternatively or additionally, the temperature sensor(s) 40 may be used to directly measure the temperature of the organ 20. When the temperature sensor(s) 40 is an infrared temperature sensor, the temperature sensor(s) 40 may be adjusted to measure temperature at different locations inside of the basin 30 and/or coolant container 50 by moving the temperature sensor(s) 40 relative to the basin 30 and/or coolant container 50. The temperature sensor(s) 40 may be pre-set at a specific location(s) relative to the organ 20 and/or the basin 30 and may be pre-focused in a specific direction or orientation relative to the organ 20 and/or basin 30. For example, the temperature sensor(s) 40 may be disposed outside of the basin 30 and the coolant container 50 and oriented to be aimed at the organ 20 and/or basin 30. The temperature sensor(s) 40 may be below or above the organ (20) and/or to a side of the organ (20). The temperature sensor(s) 40 may be pre-set or adjusted to measure a temperature at the location of the organ 20, of a perfusate bath in which the organ 20 is at least partially immersed, and/or of the cradle holding the organ 20. When multiple temperature sensors 40 are used, one of the temperature sensor(s) 40 may be pre-set or adjusted at a location and/or orientation different from another of the temperature sensor(s) 40. The focus of one or more temperature sensor 40 may be fixed or adjustable by the user.

Figure 3:
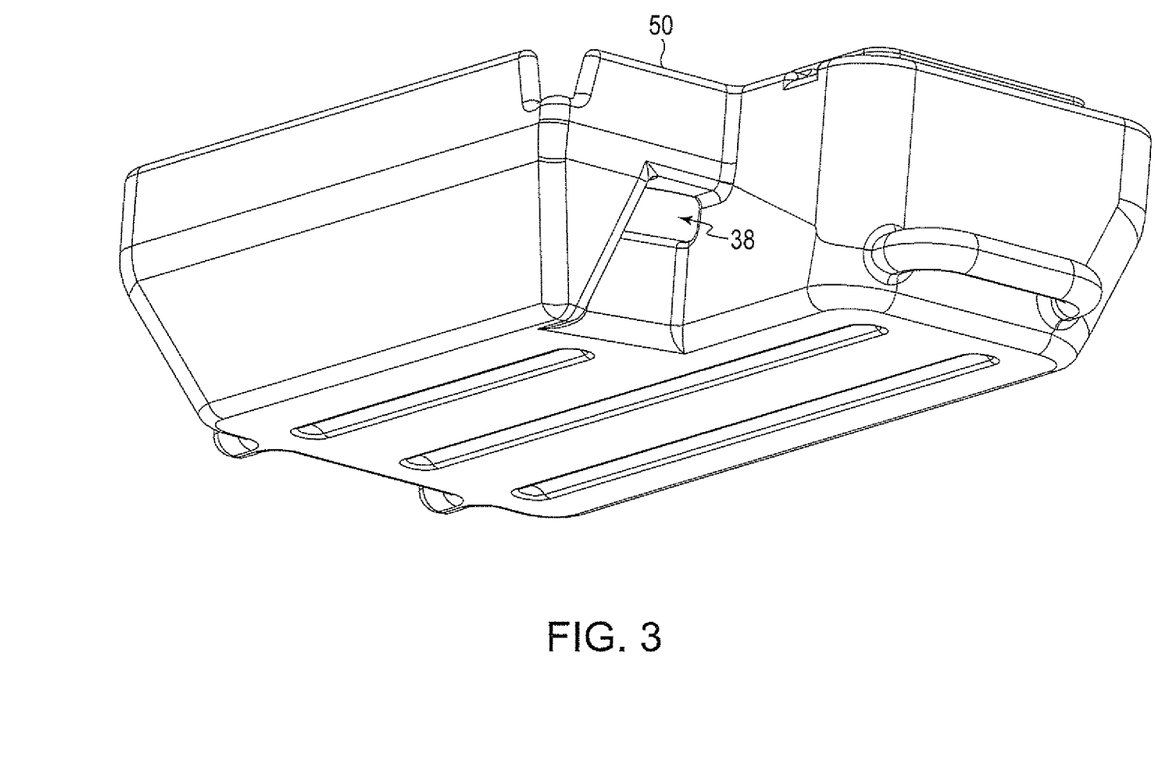
FIG. 3 is a perspective view of a coolant container.

FIG. 3 shows a perspective view of an exemplary coolant container 50. The coolant container 50 may have an aperture or cutout 38 that allows the temperature sensor 40 to measure the temperature inside of the basin 30. The aperture or cutout 38 may be open or may be closed with a material through which infrared temperature measurements can be made. Such a material may form a window that allows the temperature sensor(s) 40 to measure a temperature inside of the coolant container 50. The material of the window may be an optically clear material that allows the temperature sensor(s) 40 to measure a temperature inside of the basin 30 and/or coolant container 50. Preferred materials for the window may be polycarbonate plastic resins. A preferred material for the coolant container is an olefin such as polyethylene plastic resin. However, other polymer and non-polymer materials may be used. With multiple temperature sensors 40, multiple apertures may be provided or multiple sensors may use a single aperture. The temperature sensor 40 may also be disposed inside (wholly or in part) of the aperture or cutout 38. The temperature sensor 40 may also be disposed inside of a wall of the coolant container 50 such that an inner portion of the wall of the coolant container 50 and an outer portion of the wall of the coolant container 50 enclose the temperature sensor 40.

Figure 4:
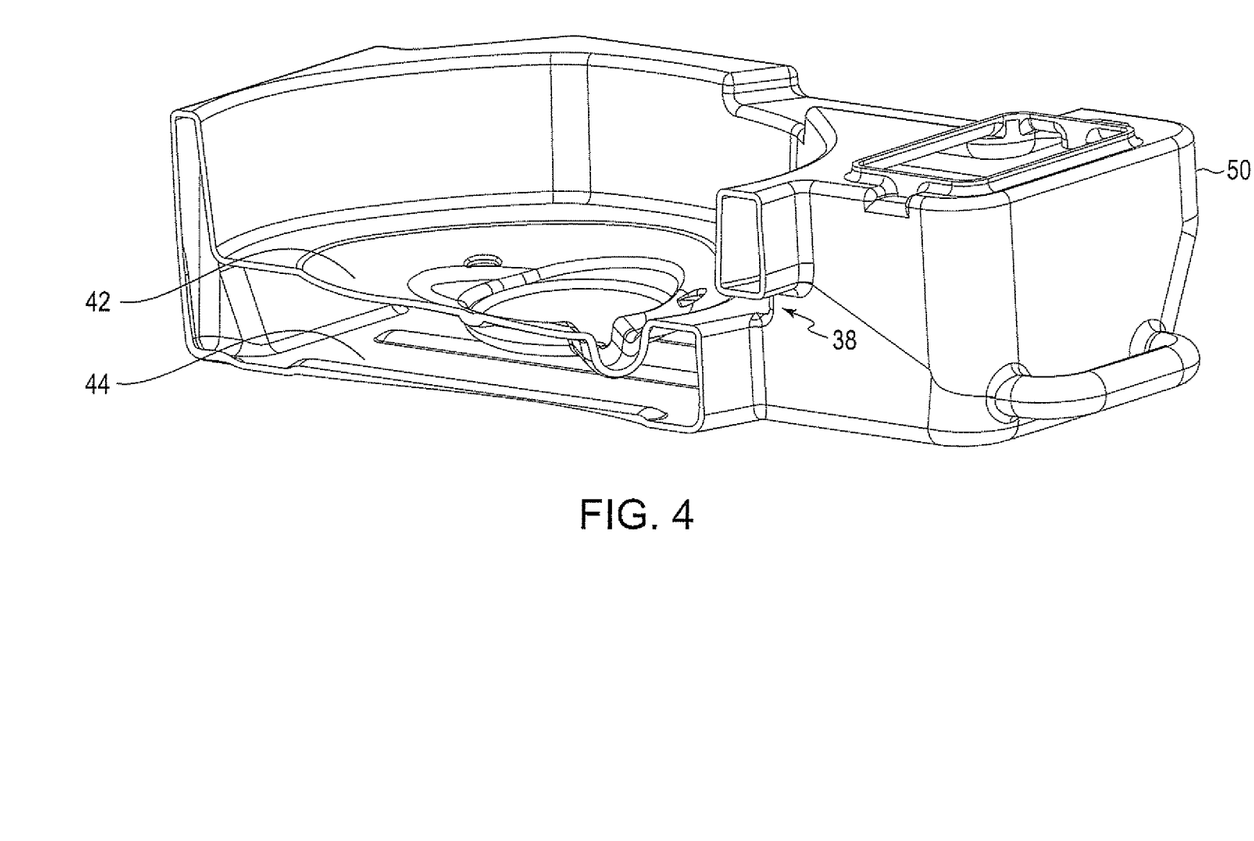
FIG. 4 is cross-section perspective view of a coolant container.

As shown in FIG. 4, the coolant container 50 may have a double wall structure such that that the double wall structure defines a gap between an inner wall 42 and an outer wall 44 of the double wall structure. The temperature sensor may be pointed at an area above the inner wall 42. FIG. 4 shows that the aperture or cutout 38 of the coolant container 50 is located in the inner wall 42. However, the aperture or cutout 38 may be located in any surface of the coolant container 50 that allows the temperature sensor 40 to measure a temperature of or inside the basin 30. The inner wall 42 may abut against the basin 30 and the outer wall 44 may be a part of an exterior portion of the apparatus 10 or may be spaced away from an exterior surface of the apparatus 10 to allow for thermal isolation from the exterior.

What has been described and illustrated herein are preferred embodiments of the invention along with some variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. An apparatus for perfusing, transporting, and/or storing a liver, the apparatus comprising:
   an organ container configured to hold a liver;
   a coolant container disposed around the organ container, the coolant container containing a coolant in a sealed state such that the coolant does not contact the liver;
   a bubble trap configured to remove a gas from a perfusate;
   a perfusate flow path configured to deliver the perfusate from the organ container to the bubble trap;
   a bypass flow path configured to deliver a de-gassed perfusate from the bubble trap to the organ container;
   a portal flow path configured to connect to a portal vein of the liver and deliver the de-gassed perfusate from the bubble trap to the liver;
   a hepatic flow path configured to connect to a hepatic artery of the liver and deliver the de-gassed perfusate from the bubble trap to the liver; and
   a first non-contact temperature sensor configured to measure a temperature of the perfusate within the organ container and a second non-contact temperature sensor configured to measure a temperature of the liver when disposed in the organ container, the first non-contact temperature sensor and the second non-contact temperature sensor being disposed on an exterior surface of the coolant container,
   wherein at least one of the portal flow path and the hepatic flow path includes a non-contact ultrasonic flow sensor configured to measure a flow of the perfusate therein.

2. The apparatus of claim 1, wherein the coolant container has an aperture through which the first non-contact temperature sensor measures a temperature of the perfusate and the second non-contact temperature sensor measures a temperature of the liver.

3. The apparatus of claim 1, further comprising a controller configured to monitor the temperatures measured by the first non-contact temperature sensor and the second non-contact temperature sensor.

4. The apparatus of claim 3, wherein the controller is configured to compare the temperatures measured by the first non-contact temperature sensor and the second non-contact temperature sensor with one or more tolerance ranges and discontinue monitoring a temperature sensor when its measured temperatures fall outside of the tolerance range.

5. The apparatus of claim 1, wherein the first non-contact temperature sensor is an infrared temperature sensor.

6. The apparatus of claim 5, wherein the second non-contact temperature sensor is an infrared temperature sensor.

7. The apparatus of claim 1, wherein the coolant container has a double wall structure, the double wall structure having an inner wall and an outer wall, and the coolant is disposed between the inner wall and the outer wall.

8. The apparatus of claim 7, wherein the inner wall and the outer wall both have an aperture through which the first non-contact temperature sensor measures a temperature of the perfusate, and the second non-contact temperature sensor is situated to measure a temperature of the liver.

9. The apparatus of claim 1, wherein at least one of the first non-contact temperature sensor and the second non-contact temperature sensor is located on an outer surface of the coolant container.

10. The apparatus of claim 1, wherein the perfusate flow path includes at least one pressure sensor configured to provide at least one of continuous and periodic monitoring of pressure therein.

11. The apparatus of claim 1, further comprising at least one accelerometer configured to at least one of continuously and periodically monitor an accelerated state of the apparatus.

12. The apparatus of claim 1, wherein the perfusate flow path includes a first filter and a second filter, the first filter and the second filter having different degrees of filtration.

13. The apparatus of claim 1, wherein the portal flow path and the hepatic flow path each include a non-contact pinch valve configured to reduce or shut off the flow of the perfusate therein, a non-contact bubble sensor, the non-contact ultrasonic flow sensor configured to measure the flow of the perfusate therein, a flow control clamp configured to control the flow of the perfusate therein, and a pressure sensor configured to monitor a pressure of the flow of the perfusate therein, disposed in this order in the respective flow path from the bubble trap to the liver.

14. An apparatus for perfusing, transporting, and/or storing a liver, the apparatus comprising:
   an organ container configured to hold a liver;
   a coolant container disposed around the organ container, the coolant container containing a coolant in a sealed state such that the coolant does not contact the liver;

a bubble trap configured to remove a gas from a perfusate;

a perfusate flow path configured to deliver the perfusate from the organ container to the bubble trap;

a bypass flow path configured to deliver a de-gassed perfusate from the bubble trap to the organ container;

a portal flow path configured to connect to a portal vein of the liver and deliver the de-gassed perfusate from the bubble trap to the liver;

a hepatic flow path configured to connect to a hepatic artery of the liver and deliver the de-gassed perfusate from the bubble trap to the liver; and a non-contact temperature sensor configured to measure a temperature of a space inside of the organ container, the non-contact temperature sensor being disposed on an exterior surface of the coolant container, wherein at least one of the portal flow path and the hepatic flow path includes a non-contact ultrasonic flow sensor configured to measure a flow of the perfusate therein.

15. The apparatus of claim 14, wherein the coolant container includes an aperture through which the non-contact temperature sensor is configured to measure the temperature of the space inside of the organ container.

16. The apparatus of claim 15, wherein the aperture is located in an outer wall of the coolant container.

17. The apparatus of claim 14, wherein the coolant container has a double wall structure that forms an internal space by way of an inner wall and an outer wall, and the coolant is disposed in the internal space.

18. The apparatus of claim 17, wherein the organ container is defined by the inner wall of the coolant container.

19. The apparatus of claim 17, wherein the outer wall of the coolant container includes a first aperture through which the non-contact temperature sensor is configured to measure the temperature of the space inside of the organ container.

20. The apparatus of claim 19, wherein the inner wall of the coolant container includes a second aperture through which the non-contact temperature sensor is configured to measure the temperature of the space inside of the organ container.

21. The apparatus of claim 14, wherein the non-contact temperature sensor is located on an outer surface of the coolant container.

22. The apparatus of claim 14, wherein the perfusate flow path includes at least one pressure sensor configured to provide at least one of continuous and periodic monitoring of pressure therein.

23. The apparatus of claim 14, further comprising at least one accelerometer configured to at least one of continuously and periodically monitor an accelerated state of the apparatus.

24. The apparatus of claim 14, wherein the perfusate flow path includes a first filter and a second filter, the first filter and the second filter having different degrees of filtration.

25. The apparatus of claim 14, wherein the portal flow path and the hepatic flow path each include a non-contact pinch valve configured to reduce or shut off the flow of the perfusate therein, a non-contact bubble sensor, the non-contact ultrasonic flow sensor configured to measure the flow of the perfusate therein, a flow control clamp configured to control the flow of the perfusate therein, and a pressure sensor configured to monitor a pressure of the flow of the perfusate therein, disposed in this order in the respective flow path from the bubble trap to the liver.

* * * * *